Figure 2:
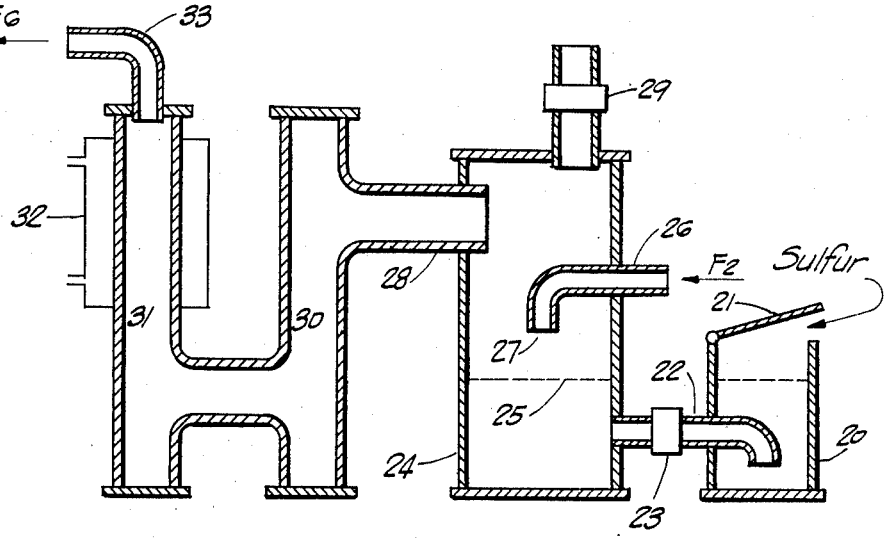

June 5, 1951     J. F. GALL     2,555,739
PRODUCTION OF SULFUR HEXAFLUORIDE

Filed June 28, 1947     2 Sheets-Sheet 1

John F. Gall
INVENTOR.

BY *[signature]*
ATTORNEY

John F. Gall
INVENTOR.

Patented June 5, 1951

2,555,739

UNITED STATES PATENT OFFICE 2,555,739

PRODUCTION OF SULFUR HEXAFLUORIDE

John F. Gall, Narberth, Pa., assignor to The Pennsylvania Salt Manufacturing Company, Philadelphia, Pa., a corporation of Pennsylvania Application June 28, 1947, Serial No. 757,913

6 Claims. (Cl. 23—205)

This invention relates to a method of reacting fluorine with sulfur to form sulfur hexafluoride and to a new apparatus for carrying out such a reaction.

It is known that fluorine can be reacted with sulfur to form a series of florides including $SF_6$, $S_2F_{10}$, and various lower fluorides. Of these, $SF_6$ is considered a desirable product for various purposes and it is usual to carry out the reaction so as to form this particular compound in predominating amount. A crude product predominating in sulfur hexafluoride has been made heretofore, for exmaple by passing gaseous fluorine through a horizontal tube in which is a vessel containing molten sulfur. Sulfur burns in the fluorine stream and a gaseous effluent predominating in $SF_6$ is obtained. This method however, has many disadvantages; namely, it is not possible to effect proper control of the contact of fluorine with sulfur, so that either a substantial quantity of fluorine passes through the tube without reaction, or unreacted sulfur or large quantities of lower fluorides are found in the reaction product; moreover, the process is not adaptable to continuous operation.

I have now discovered an advantageous continuous method for producing crude sulfur hexafluoride with increased efficiency of operation. My method involves maintaining a body of molten sulfur, causing a stream of elemental fluorine to be directed downwardly onto the surface of molten sulfur, and regulating the fluorine flow with respect to the surface of the sulfur so as to feed about one pound per hour of fluorine for about each twenty to one hundred square inches of surface of molten sulfur. Preferably one pound per hour of fluorine is fed for every twenty-five to forty square inches of surface of molten sulfur. In preferred operation I also maintain the level of the molten sulfur by continuously feeding sulfur to the pool through an inlet located below the surface of the sulfur. When the downwardly directed stream of elemental fluorine impinges upon the surface of the molten sulfur, the fluorine immediately spreads across the surface of the sulfur where it supports the combustion of the sulfur, primarily to sulfur hexafluoride, which is then forced upward by the continued flow of elemental fluorine. A housing is provided extending away from the surface of the sulfur to conduct away the crude sulfur hexafluoride reaction mixture. I have found that with this method of operation, despite the much lower density of fluorine as compared to sulfur hexafluoride, a surprisingly small amount of unreacted fluorine, usually none, is carried upwardly with the reaction product.

My new apparatus for bringing about this reaction comprises a vessel for containing a body of molten sulfur, a relatively large conduit for leading reaction product away from above the surface of the molten sulfur and a relatively smaller conduit for bringing elemental fluorine into the reaction zone, the latter conduit being so positioned that it directs a substantially vertical stream of the gaseous reactant down onto the surface of the liquid reactant. Preferably my apparatus also contains means such as a liquid sulfur seal through which sulfur may be substantially continuously fed into the pool of molten sulfur below its surface. Also the conduit for leading away the reaction product preferably contains a settling chamber where entrained solid particles may be settled out.

It will be noted an important element of my apparatus is the jet for directing a stream of gaseous reactant substantially vertically downward onto the surface of the liquid reactant. Multiple jets may, of course, be employed in larger installations. Preferably the jet or jets are of such cross-sectional area relative to the fluorine flow that very little gas pressure is required to maintain the desired fluorine flow, for example, no more than a fraction of the pressure that can be tolerated in the usual commercial cells for electrolytic production of fluorine, e. g. fluorine pressures up to about ½" of water should be sufficient for operation of my apparatus. Preferably the ends of the gas jets are located from one to six inches up above the liquid sulfur level, preferably from two to three inches. With this spacing the low pressure indicated is adequate to distribute the incoming gas evenly over the liquid surface and to cause the incoming gas to force the gaseous reaction product away from the surface.

Figure 1:
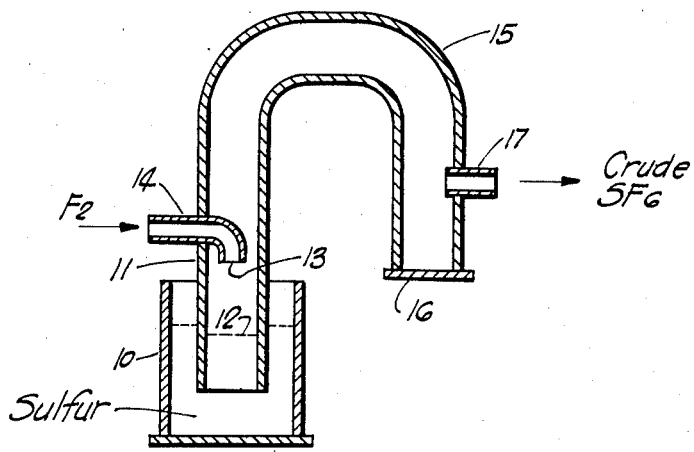
Figure 3:
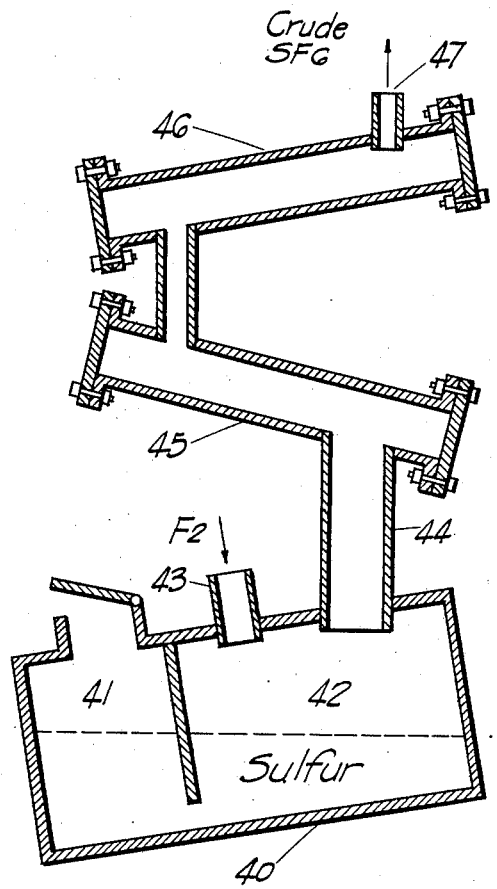

The process and apparatus of my invention may be better understood by reference to the accompanying drawings which are a part of this application and which show diagrammatically several embodiments of the apparatus of my invention and which provide a basis for describing the preferred process of my invention. Figure 1 is a representation, in vertical section, of a form of apparatus within the scope of my invention suitable for the smallest installations. Figure 2 represents in diagrammatic form a vertical section of my embodiment of the apparatus of my invention suitable for installations of intermediate size. Figure 3 is a vertical sectional of an embodiment of the apparatus of my invention, shown in diagrammatic form, suitable for larger installations.

Referring to Figure 1, reference numeral 10 indicates the vessel into which sulfur is fed. Molten sulfur is fed into the annular space in this vessel and since this annular space is connected at the bottom of the vessel with the chamber formed within the housing 11, this arrangement constitutes a liquid sulfur seal for continuously furnishing molten sulfur to the chamber within the housing 11. The broken line 12 indicates the surface of the molten sulfur along which reaction occurs. 13 indicates the outlet of the fluorine feed pipe 14. Since this outlet is directed downwardly it causes a stream of fluorine to be directed against the surface 12 of molten sulfur.

As combustion occurs, the crude sulfur hexafluoride product of reaction is forced up within the housing 11 and passes around into the leg 15 of this housing where solid particles (and possibly droplets of liquid such as unreacted sulfur) that are entrained in the crude product may drop down to the plate 16 from whence they may be periodically removed. Crude sulfur hexafluoride is withdrawn through the conduit 17 from whence it passes to a purification train.

In Figure 2 of the drawing reference numeral 20 indicates a sulfur melter equipped with lid 21. Entering sulfur is charged into the melter 20 where heat is supplied at approximately 130° C. to melt the sulfur and maintain it at a suitable temperature for the sulfur burner. Molten sulfur from 20 passes through the conduit 22, with its flow regulated by the valve 23, into the vessel 24 where it forms a pool of sulfur exposing the surface 25. Fluorine gas is supplied through the conduit 26 whose downwardly directed outlet 27 causes a stream of fluorine gas to impinge upon the surface 25 of the molten sulfur where reaction occurs to form primarily sulfur hexafluoride. The sulfur hexafluoride and other products of reaction are forced upwardly and are withdrawn through the conduit 28. 29 indicates a safety valve and vent for release of any sudden pressure. The crude reaction product passes from conduit 28 into chambers 30 and 31. Entrained particles may settle out in the bottom of these chambers which are so designed that their top and bottom heads can be readily removed for cleaning. A jacket 32 may be provided surrounding the second chamber 31 for cooling purposes. The crude sulfur hexafluoride product is withdrawn through the conduit 33 from whence it passes to the purification train.

Figure 3 shows a somewhat modified form of the apparatus of Figure 2. The drum 40 which is in a position tilted slightly from the horizontal has a lower portion 41 which serves as a sulfur melter and an upper chamber 42 which is the combustion chamber. Fluorine gas from the inlet 43 impinges upon the surface of the sulfur in the combustion chamber 42. The crude products of reaction are withdrawn through the conduit 44, passed successively through the chambers 45 and 46. All conduits and chambers shown are preferably of circular cross-section. The ends of cylinders 45 and 46 can be readily removed for cleaning of the chambers. Crude sulfur hexafluoride product of reaction is removed from the conduit 47. If desired, two identical assemblies of elements 44 to 47 inclusive may be mounted upon the drum 40 and each of these assemblies may be in operation alternately to permit cleaning of the idle assembly without interrupting operation of the process.

The following examples are illustrative of the process of my invention.

*Example 1*

Employing apparatus such as that illustrated in Figure 1 of the drawing, fluorine is passed in through conduit 14 at the rate of about one-tenth pound per hour while sulfur is furnished to the vessel 10 at a temperature of about 130° C. and at a rate to maintain a substantially constant level of sulfur at 12. The outlet 13 of conduit 14 is located 2 inches above the sulfur surface, and the surface area of the sulfur is 3 square inches. The fluorine gas impinges upon the surface of the molten sulfur and the heat of reaction maintains the sulfur at a temperature of about 150° C. The crude product of reaction is forced upwardly around the bend in the apparatus and is eventually withdrawn through 17. This product contains about 80% sulfur hexafluoride, about 4% HF, about 15% lower fluorides of sulfur, and about 1% air.

*Example 2*

Employing an apparatus such as that illustrated in Figure 2 of the drawing, sulfur is melted in vessel 20 and brought to a temperature of about 130° C. The outlet 27 of conduit 26 is located about 2 inches above the sulfur surface, and the surface area of the sulfur is about 100 square inches. Fluorine is fed in through conduit 26 at the rate of about 2.6 pounds per hour. The reaction between fluorine and sulfur maintains the temperature in the combustion zone above 200° C. during the operation. A crude product of reaction similar to that described in Example 1 is withdrawn from the apparatus through conduit 33.

*Example 3*

Sulfur hexafluoride is produced in an apparatus like that illustrated in Figure 3 under essentially the same operating conditions as described in Example 2 above, except that the rate of fluorine input is about five pounds per hour. The outlet of the pipe 43 is located about 3 inches above the sulfur surface, and the area of the sulfur surface is about 200 square inches.

The crude sulfur hexafluoride produced in the process of my invention as above described may advantageously be purified as described in my copending application Ser. No. 757,917, now Patent No. 2,462,379, issued Feb. 22, 1949, entitled "Purification of Sulfur Hexafluoride" filed the same day as this application.

Since many modifications are possible in the process and apparatus of my invention as above described without departing from the scope of the invention, it is intended that the above description of my invention should be interpreted as illustrative, and the invention is not to be limited except as set forth in the claims which follow.

I claim:

1. The process for reacting sulfur and fluorine to form predominantly sulfur hexafluoride that comprises maintaining a body of molten sulfur, directing a stream of fluorine gas downwardly to impinge upon the surface of the molten sulfur, regulating the flow of the gaseous fluorine to supply about one pound per hour of fluorine for every twenty to one-hundred square inches of surface of molten sulfur, and withdrawing the gaseous products of the resulting reaction.

2. The process for reacting sulfur and fluorine to form predominantly sulfur hexafluoride that comprises maintaining a body of molten sulfur, directing a stream of fluorine gas downwardly to impinge upon the surface of the molten sulfur, regulating the flow of the gaseous fluorine to supply about one pound per hour of fluorine for every twenty-five to forty square inches of surface of molten sulfur, supplying sulfur to the body thereof without interruption of the process, and withdrawing the gaseous products of the resulting reaction.

3. The process for reacting sulfur and fluorine to form predominantly sulfur hexafluoride that comprises maintaining a body of molten sulfur, directing a stream of fluorine gas downwardly to impinge upon the surface of the molten sulfur, the outlet of the fluorine gas jet being located from about one to six inches above the surface of the molten sulfur, regulating the flow of the gaseous fluorine to supply about one pound per hour of fluorine for every twenty to one-hundred square inches of surface of molten sulfur, and withdrawing the gaseous products of the resulting reaction upwardly from the sulfur surface.

4. The process for reacting sulfur and fluorine to form predominantly sulfur hexafluoride that comprises maintaining a body of molten sulfur, directing a stream of fluorine gas downwardly to impinge upon the surface of the molten sulfur, the outlet of the gas jet being located from about two to three inches above the surface of the molten sulfur, regulating the flow of the gaseous fluorine to supply about one pound per hour of fluorine for every twenty-five to forty square inches of surface of molten sulfur, maintaining the sulfur level by feeding sulfur to the body thereof through a liquid sulfur seal, and withdrawing the gaseous products of the resulting reaction upwardly from the sulfur surface.

5. The process for reacting sulfur and fluorine to form predominantly sulfur hexafluoride that comprises providing a surface of molten sulfur, directing a stream of fluorine gas against said surface of molten sulfur at a substantial angle thereto, regulating the flow of the gaseous fluorine to supply not substantially over about one pound per hour of fluorine for every twenty square inches of said surface of molten sulfur and withdrawing the gaseous products of the resulting reaction.

6. The process for reacting sulfur and fluorine to form predominantly sulfur hexafluoride that comprises maintaining a body of molten sulfur, directing a stream of fluorine gas downwardly to impinge upon the surface of the molten sulfur, regulating the flow of the gaseous fluorine to supply not substantially over about one pound per hour of fluorine for every twenty square inches of said surface of molten sulfur and withdrawing the gaseous products of the resulting reaction.

JOHN F. GALL.

REFERENCES CITED

The following references are of record in the file of this patent:

UNITED STATES PATENTS

| Number | Name | Date |
| --- | --- | --- |
| 1,409,338 | Fenton | Mar. 14, 1922 |
| 2,153,953 | Burke | Apr. 11, 1939 |